United States Patent [19]

Lewis

[11] Patent Number: 4,470,231
[45] Date of Patent: Sep. 11, 1984

[54] REMOVABLE CLOSURE PANELS FOR LIVESTOCK TRAILER, BODY OR CONTAINER

[75] Inventor: Mack A. Lewis, Sioux City, Iowa

[73] Assignee: Wilson Trailer Company, Sioux City, Iowa

[21] Appl. No.: 290,728

[22] Filed: Aug. 6, 1981

[51] Int. Cl.³ .............................................. E06B 1/04
[52] U.S. Cl. ...................................... 52/204; 52/768; 52/769; 52/772; 52/778; 296/181; 296/183; 119/8; 292/69
[58] Field of Search .................. 52/204, 461, 463, 768, 52/769, 772, 777, 778, 476, 506, 716; 292/59, 68, 69; 119/8; 105/378, 370; 49/38, 488; 296/181, 183

[56] References Cited

U.S. PATENT DOCUMENTS 3,126,224  3/1964  Carter, Jr. et al. ................. 105/378
3,518,792  7/1970  Williamson et al. ................... 49/488

Primary Examiner—Henry E. Raduazo
Attorney, Agent, or Firm—Harvey B. Jacobson

[57] ABSTRACT

A load body is provided defining at least one upstanding wall construction, including laterally spaced upstanding structural members spaced therealong and upper and lower downwardly and upwardly facing surfaces extending along upper and lower marginal portions of the one wall construction. Each pair of adjacent structural members includes adjacent marginal portions defining outwardly facing abutment and seal surfaces extending therealong and outwardly facing abutment surface portions spaced therealong, each spaced at least slightly from the corresponding abutment and seal surface toward the adjacent structural member. A removable upstanding body closure panel is provided for mounting between each pair of adjacent structural members and includes opposite upstanding side marginal edge portions extending therealong having inner side surfaces abutted against the abutment surface portions and elongated seals extending along and projecting edgewise outwardly therefrom for overlapped engagement with the corresponding pair of abutment and seal surfaces. Further, structure is carried by each of the structural members operative to releasably engage and apply a yieldable inward force on each adjacent closure panel marginal edge portion.

9 Claims, 6 Drawing Figures

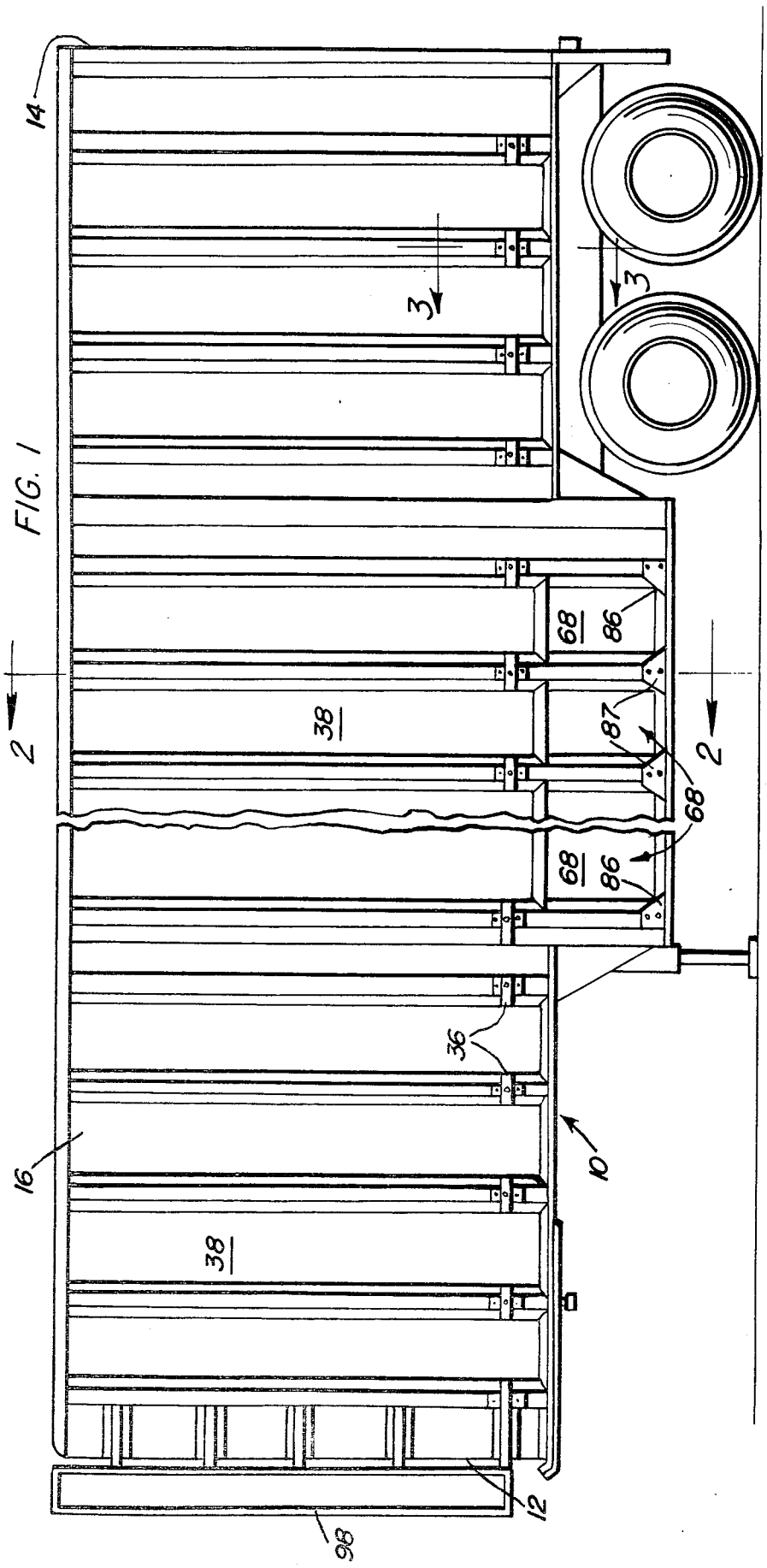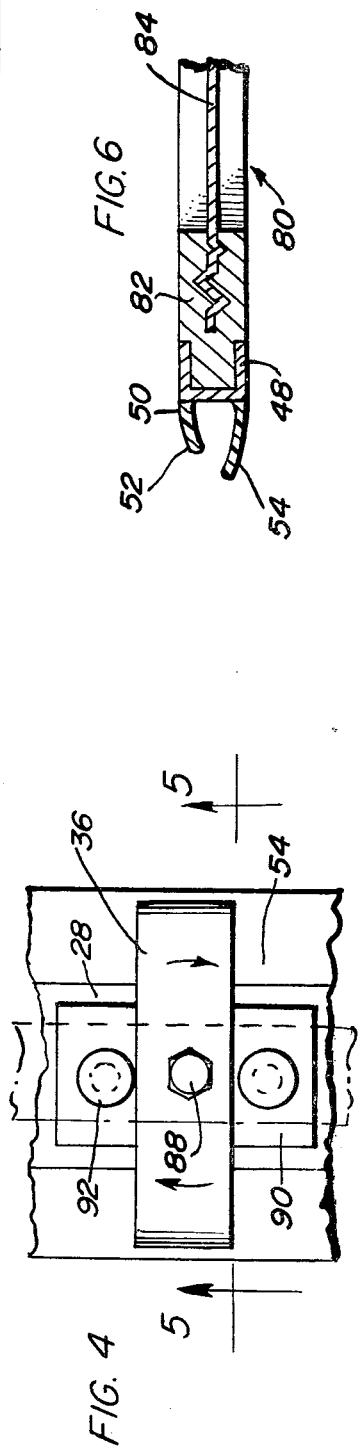

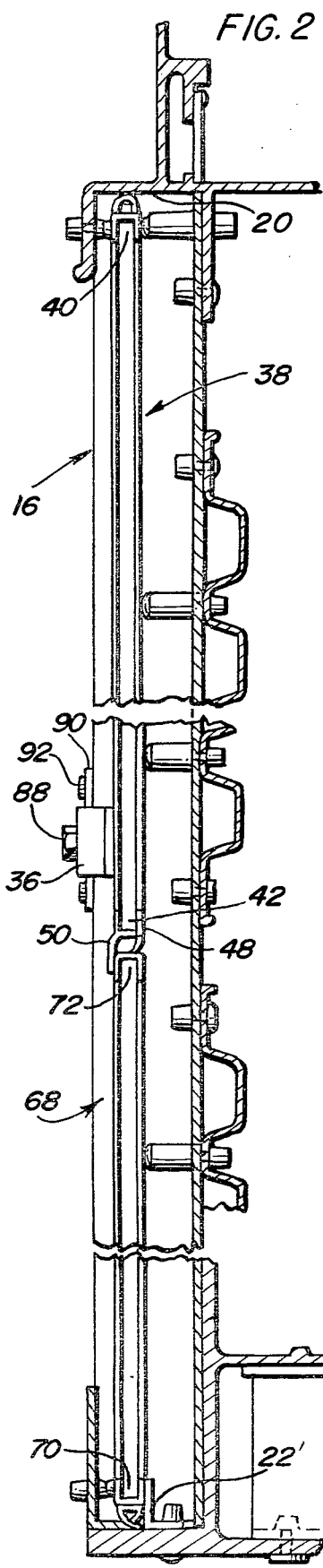
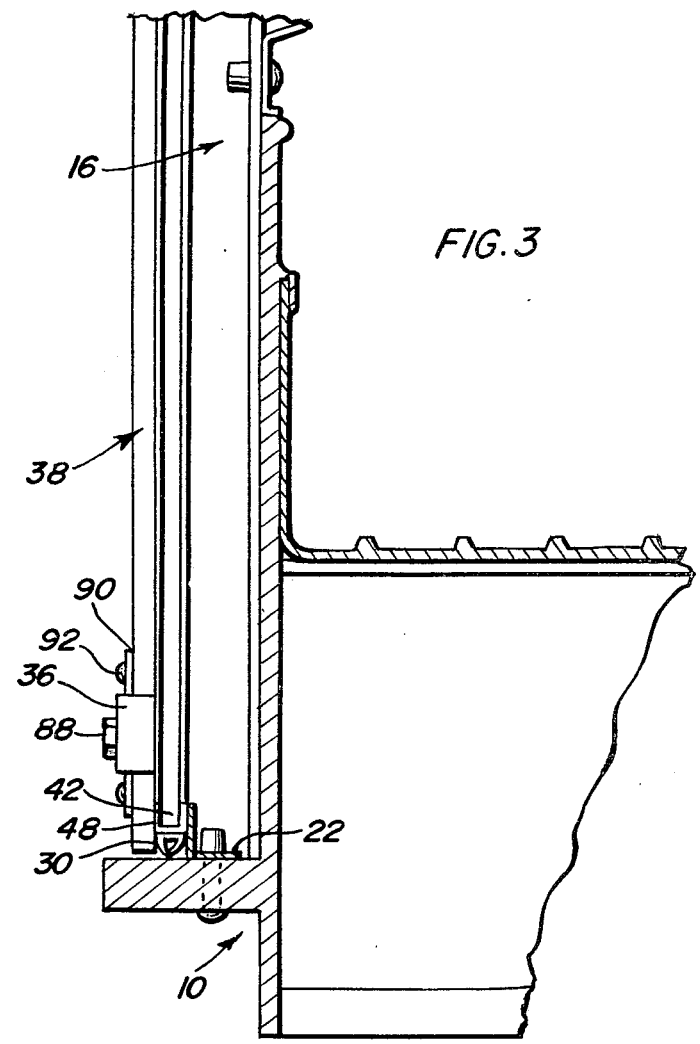
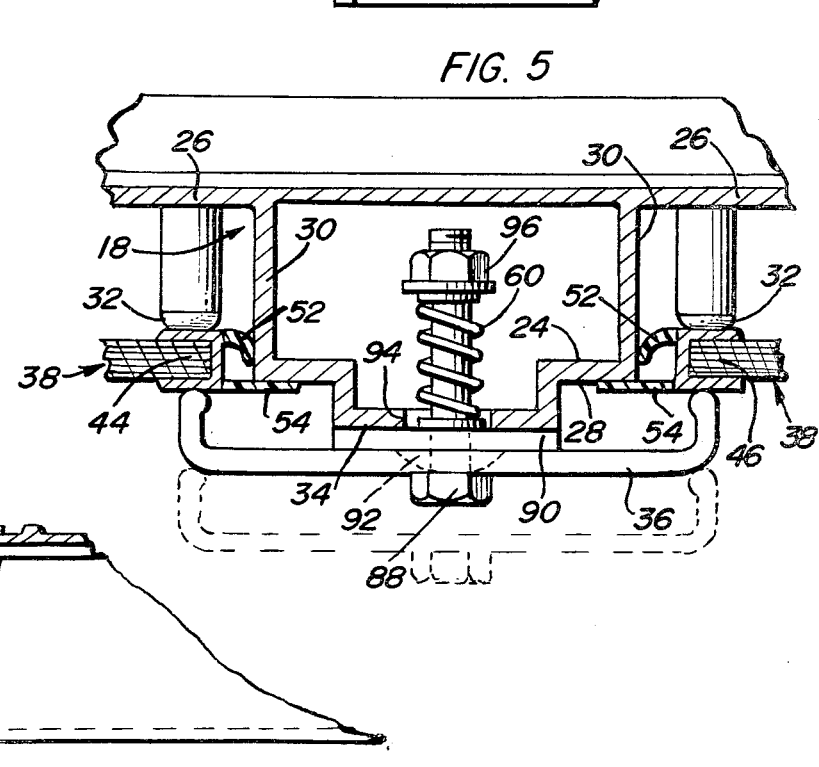

REMOVABLE CLOSURE PANELS FOR LIVESTOCK TRAILER, BODY OR CONTAINER

BACKGROUND OF THE INVENTION

Livestock trailers and other vehicle bodies heretofore have been provided with considerable open areas in the side walls thereof to facilitate ventilation during the shipment of livestock. However, such trailers, including open areas in the side walls thereof, are not suitable for shipping other types of freight, such as boxes and containers as well as bulk loads which may be damaged by inclement weather. Accordingly, livestock trailers of the type including open area side walls may not be used for other freight carrying purposes and are thus, for the most part, limited to one-way loads and subject to only occasional use. Therefore, a need exists for structure whereby a livestock trailer including considerable open areas in the side walls thereof may be converted into a fully closed trailer which may be used in all types of weather for transporting bulk loads.

Examples of livestock vehicle load bodies and the like which may be converted into substantially fully closed bodies for hauling bulk freight are disclosed in U.S. Pat. Nos. 365,461, 437,332, 965,203, 967,318, 1,563,470 and 2,166,475. However, these previously known forms of convertible vehicle load bodies, for the most part, are not constructed in a manner whereby a totally weather-type bulk freight enclosure therefor may be provided.

BRIEF DESCRIPTION OF THE INVENTION

The load body of the instant invention is constructed in a manner whereby a livestock load body is defined including considerable open areas in the side walls thereof and includes panels removably mounted on the body for closing the open areas in substantially weather-tight relation in order to adapt the load body for also transporting bulk freight. The closure panels are of such construction whereby they may be transported on the load body when the latter is in a configuration defining a livestock load body in order that livestock may be carried in one direction and the load body may be subsequently cleaned and substantially fully closed in a weather-tight manner for carrying bulk freight in the other or return direction.

The main object of this invention is to provide a convertible load body which may be used not only to carry livestock but also to carry bulk loads of different types.

Another object of this invention is to provide a vehicle body construction wherein closure panels for the open areas of the side walls thereof may be readily removably mounted in position for substantially fully closing the load body in a weather-tight manner.

Yet another object of this invention is to provide a load body with removable closure panels of such construction enabling a plurality of the removable closure panels to be stored in a compact state and to therefore be transported with the load body when the latter is not in use as a fully closed load body.

A further object of this invention is to provide a load body including removable closure panels and with each of the vertical edges of the closure panels enjoying a double seal with the adjacent permanent portions of the load body.

A final object of this invention to be specifically enumerated herein is to provide a load body in accordance with the preceding objects and which will conform to conventional forms of manufacture, be of simple construction and easy to use, so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a side elevational view of a semi-trailer body constructed in accordance with the present invention and with a central portion of the trailer body being broken away;

FIG. 2 is an enlarged fragmentary vertical sectional view taken substantially upon the plane indicated by the section line 2—2 of FIG. 1;

FIG. 3 is an enlarged fragmentary transverse vertical sectional view taken substantially upon the plane indicated by the section line 3—3 of FIG. 1;

FIG. 4 is a fragmentary elevational view of the outer side of one of the upstanding structural members of the load body and illustrating the removable panel retaining latch structure supported therefrom;

FIG. 5 is a fragmentary enlarged horizontal sectional view taken substantially upon the plane indicated by the section line 5—5 of FIG. 4; and FIG. 6 is a fragmentary enlarged horizontal sectional view illustrating one vertical marginal edge portion of a modified form of removable panel.

DETAILED DESCRIPTION OF THE INVENTION

Referring now more specifically to the drawings, the numeral 10 generally designates a semi-trailer constructed in accordance with the present invention. The semi-trailer includes front and rear walls 12 and 14 and a pair of opposite side wall constructions 16.

For the purpose of illustration of the instant invention only the left side wall construction 16 will be discussed in detail, it being understood that the right upstanding side wall construction 16 is substantially identical to the left side wall construction 16.

The left side wall construction 16 includes a plurality of laterally spaced upstanding structural members 18 spaced therealong and extending between upper and lower downwardly and upwardly facing surfaces 20 and 22 extending along upper and lower marginal portions of the wall construction 16. The structural members 18 each include central tubular portions 24 and opposite side flange portions 26. Each of the tubular portions 24 defines a pair of opposite side upstanding and longitudinally extending abutment and seal surfaces 28 and also a pair of upstanding opposite side and oppositely outwardly facing seal edges 30. Further, each of the flange portions 26 includes a plurality of outwardly facing abutment surface portions 32 spaced therealong and at least slightly spaced from each adjacent abutment and seal surface 28 toward the adjacent structural member 18. Also, each structural member 18 includes an outwardly offset central portion 34 from which a spring biased and pivotally mounted latch member 36 is supported.

A plurality of closure panels referred to in general by the reference numeral 38 are provided and each closure panel 38 is generally rectangular in configuration and includes upper and lower marginal edge portions 40 and 42 and upstanding opposite side marginal edge portions 44 and 46. Each of the panels 38 may comprise a plywood or other suitable panel and includes a channel-shaped reinforcing member 48 extending along each of its marginal edge portions. Further, each reinforcing member 48 supports a double flange seal structure 50 therefrom including a pair of laterally spaced short and long seal flanges 52 and 54 extending therealong, see FIG. 6. The seal flanges 52 and 54 project outwardly of the corresponding marginal edges of the panels and are slightly transversely arcuate and curve slightly toward each other with the outer edge of the longer flange 54 projecting outwardly of the outer edge of the corresponding shorter flange 52.

The seal flanges 52 and 54 are extruded from dual durometer outdoor vinyl. The seal structure 52 is formed integrally with the reinforcing member 48, the latter being of rigid vinyl.

When it is desired to close a space between adjacent structural members 18, a closure panel 38 is positioned between the corresponding structural members 18 in the manner illustrated in FIGS. 2 and 5 of the drawings with the reinforcing member 48 extending across the upper marginal edge of the closure panel and the reinforcing members 48 extending along the vertical side marginal edges of the closure panels abutted against the abutment surface portions 32. The upper marginal edge reinforcing member 48 opposes the downwardly facing upper surface 20 and the seal structure 30 supported from the upper marginal edge reinforcing member 48 assumes the configuration thereof illustrated in FIG. 2 of the drawings. Further, the seal structure 50 carried by the lower marginal edge reinforcing member 48 assumes the configuration thereof illustrated in FIG. 3 and the short flanges 52 of the seal structures 50 extending along the vertical edge portions of the closure panel 38 engage and are deflected outwardly by the surface portions 30 while the corresponding long seal flanges 54 are substantially straightened and overlapped with the adjacent abutment and seal surfaces 28.

The latch members 36 are carried by lower portions of the corresponding structural members 18 and may be outwardly withdrawn to the phantom line positions thereof illustrated in FIG. 5 and thereafter turned 90° so as to parallel the central portions 34 and thus enable removal of the closure panels 38. Of course, when the closure panels 38 are being installed, the latch members 36 are initially positioned to parallel the central portions 34 of the structural members 18 and after the closure panels 38 have been mounted in position, the latch members 36 are turned 90° and allowed to be pulled inwardly by the corresponding compression springs 60.

The closure panels 38 extend fully between the upper and lower surfaces 20 and 22 in the front and rear portions of the wall construction 16. However, in the central portion of the trailer 10, an upwardly facing lower surface 22′ corresponding to the surface 22 is downwardly displaced relative to the lower surface 22 and a plurality of substantially identical but shorter closure panels referred to in general by the reference numerals 68 are utilized in the lower portions of the open spaces defined in the drop center portion of the trailer 10. The closure panels 68 have their lower marginal portions supported from the upwardly facing lower surface 22′ and the upper marginal edge portions 72 thereof support the lower marginal edge portions 42 of the closure panels 38 disposed immediately thereabove. It may be seen from FIG. 2 of the drawings that the upper marginal edges 72 of the closure panels 68 are not equipped with seal structures corresponding to the seal structures 50. Rather, the seal structure 50 carried by the lower marginal edges of the closure panels 38 disposed immediately above the closure panels 68 sealingly engage the upper marginal edge portions 72 of the closure panel 68 in substantially the same manner in which the opposite side marginal edge seal structures 50 of the closure panels 38 engage the corresponding marginal edges of the structural members 18. Accordingly, the strength of each of the seal structures 50 carried by the lower marginal edges of the central closure panels 38 is sufficiently strong to support the entire weight of the closure panel 38 disposed thereabove from the closure panel 68 disposed therebelow.

With attention now invited to FIG. 6 of the drawings, there may be seen a modified form of closure panel referred to in general by the reference numeral 80. The closure panel 80 is substantially identical to the closure panel 38, except that the closure panel 80 includes a peripheral frame 82 from which the corresponding reinforcing members 48 and seal structures 50 are supported. The peripheral frame 82 is closed by a sheet metal panel 84 extending between and anchored relative to the marginal portions of the frame 82.

It will be noted that the closure panels 38 disposed above the closure panels 68 may be initially installed by first upwardly inserting the upper marginal edges of the closure panels 38 between corresponding structural members 18 and thereafter horizontally inwardly displacing the lower marginal edges of those closure panels into sealed engagement with the upper marginal edges 72 of the closure panels 68. Of course, the closure panels 68 are installed prior to the corresponding closure panels 38 and the lower ends of the structural members 38 between which the closure panels 68 are mounted include angular reinforcing members 86 and 87 supported therefrom behind which the lower corners of the closure panels 68 are retained.

The latching members 36 receive the shank portions of attaching bolts 88 through their midportions and the shank portions of the bolts 88 pass through centrally apertured plates 90 secured over the central portions 34 by suitable fasteners 92. The central portions 34 include bores 94 formed therethrough registered with the central apertures in the plates 90 and each compression spring 60 is disposed about the shank of the bolt 88 between a threaded nut 96 mounted on the shank of the bolt 88 and the inner surface of the corresponding plate 90. Thus, the springs 60 yieldingly bias the latch members 36 to the solid line positions thereof illustrated in FIG. 5.

When the closure panels 38 and 68 are not in use, they may be arranged in compact state and stored within a housing 98 provided therefor mounted from and forward of the front wall 12. Accordingly, it may be seen that the semi-trailer may be readily converted from a livestock trailer to a fully enclosed trailer.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A load body construction including at least one upstanding wall construction, said one wall construction including laterally spaced upstanding structural members spaced therealong and upper and lower downwardly and upwardly facing surfaces extending along upper and lower marginal portions of said one wall construction, each pair of adjacent structural members including adjacent marginal portions defining outwardly facing and outwardly unobstructed abutment and seal surfaces extending therealong and outwardly facing abutment surface portions spaced therealong and at least slightly from each abutment and seal surface toward the adjacent abutment and seal surface of the adjacent structural member, a removable upstanding body closure panel for lateral displacement toward and mounting between each pair of adjacent structural members and said upper and lower surfaces, each body closure panel including opposite upstanding side marginal edge portions extending therealong having inner side surfaces laterally abutted against said abutment surface portions and elongated seals extending along and projecting endwise outwardly therefrom for overlapped engagement with the corresponding pair of abutment and seal surfaces, and retaining means shiftably supported from each of such structural members for movement between first active positions projecting outwardly from said structural members and overlying said abutment and seal surfaces in spaced relation relative thereto and second inactive positions retracted out of position overlying said abutment and seal surfaces, said retaining means, when in said active positions being operative to releasably engage and apply a yieldable inward force on each adjacent closure panel marginal edge portion to clamp the latter against the opposing abutment and seal surface.

2. The body construction of claim 1 wherein adjacent marginal edge portions of adjacent structural members include opposing longitudinal seal edges extending therealong inwardly of the corresponding outwardly facing abutment and seal surfaces, said elongated seals each including an inner resilient lip flange extending outwardly therefrom engaging and outwardly deflected by the corresponding seal edge.

3. The body construction of claim 2 wherein said seals each also include an outer resilient lip flange extending outwardly therefrom and comprising the portion of said seal disposed in overlapped engagement with the corresponding abutment and seal surface.

4. The body construction of claim 3 wherein said upstanding marginal edge portions of said closure panels include reinforcing members extending therealong from which said seals are supported.

5. The body construction of claim 1 wherein each of said body closure panels includes upper and lower marginal edges received between said upper and lower downwardly and upwardly facing surfaces and seal means extending therealong sealingly engaged with the last mentioned surfaces.

6. The body construction of claim 5 wherein adjacent marginal edge portions of adjacent structural members include opposing longitudinal seal edges extending therealong inwardly of the corresponding outwardly facing abutment and seal surfaces, said elongated seals each including an inner resilient lip flange extending outwardly therefrom engaging and outwardly deflected by the corresponding seal edge.

7. The body construction of claim 6 wherein said seals each also include an outer resilient lip flange extending outwardly therefrom and comprising the portion of said seal disposed in overlapped engagement with the corresponding abutment and seal surface.

8. The body construction of claim 7 wherein said upstanding marginal edge portions of said closure panels include reinforcing members extending therealong from which said seals are supported.

9. The body construction of claim 1 wherein said removable upstanding body closure panel includes separate upper and lower panel portions each including upstanding side marginal edges laterally abutted against said abutment surface portions and elongated seals extending therealong disposed in overlapped engagement with the corresponding pair of abutment and seal surfaces, said retaining means being operatively associated with said upper panel portion, only, said upper and lower panel portions including opposing horizontal lower and upper edges, respectively, said horizontal lower edge including an edgewise outwardly projecting seal lapped over the outer side of said lower panel portion immediately adjacent said horizontal upper edge of said lower panel portion.

* * * * *